(12) United States Patent
Lieberman

(10) Patent No.: US 6,353,822 B1
(45) Date of Patent: Mar. 5, 2002

(54) PROGRAM-LISTING APPENDIX

(75) Inventor: Henry Lieberman, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 709 days.

(21) Appl. No.: 08/701,242

(22) Filed: Aug. 22, 1996

(51) Int. Cl.[7] .............................................. G06F 17/30
(52) U.S. Cl. ..................... 707/3; 707/2; 707/4; 707/5; 707/10; 707/100; 707/501.1; 707/513
(58) Field of Search .................. 395/601, 602, 395/603, 604, 605, 606, 607, 608, 609, 610, 611, 616, 704, 759, 680, 828; 707/1, 2, 3, 4, 5, 10, 100, 200, 704, 759, 500, 513, 501.1

(56) References Cited

U.S. PATENT DOCUMENTS

| | | | |
|---|---|---|---|
| 5,475,843 A | * 12/1995 | Halviatti et al. | ............ 395/704 |
| 5,519,608 A | * 5/1996 | Kupiec | ........................ 395/759 |
| 5,544,316 A | * 8/1996 | Carpenter et al. | .......... 395/680 |
| 5,617,565 A | * 4/1997 | Augenbraun et al. | ....... 395/604 |
| 5,655,148 A | * 8/1997 | Richman et al. | ............ 395/828 |
| 5,708,825 A | * 1/1998 | Sotomayor | |

OTHER PUBLICATIONS

Robert Armstrong, et al., "WebWatcher: A Learning Apprentice for the World Wide Web"; *School of Computer Science, Carnegie Mellon University* (1995).

Marko Balabanovic, et al.; "Learning Information Retrieval Agents: Experiments with Automated Web Browsing".

Pattie Maes; "Agents that Reduce Work and Information Overload"; *Communications of the ACM*, 37:31–40 (1994).

* cited by examiner

*Primary Examiner*—Hosain T. Alam
*Assistant Examiner*—Ella Colbert
(74) *Attorney, Agent, or Firm*—Testa, Hurwitz & Thibeault, LLP

(57) ABSTRACT

Methods and apparatus for assisting a user in retrieving documents or other data items of interest operates in tandem with a conventional document-retrieval facility, such as a web browser, by tracking the choices made by the user in retrieving and viewing data items. The invention identifies additional items likely to be of interest to the user. Preferably, the invention operates automously, without interruption of the user's activities, delivering (in real-time or upon request) a set of current recommendations. The recommendations take the form of (or include) links to the recommended items, and the user is free to execute any of these links to examine the contents of a recommendation.

30 Claims, 2 Drawing Sheets

PROGRAM-LISTING APPENDIX

GOVERNMENT FUNDING

This invention was made with government support under Contract No. 9205668-IRI awarded by the National Science Foundation. The government has certain rights in this invention.

This application is filed with an appendix containing source-code listings.

FIELD OF THE INVENTION

The present invention relates to retrieval and viewing of computer-stored documents, and in particular to automated assistance in browsing stored resources, such as those available on the Internet.

BACKGROUND OF THE INVENTION

The Internet is a worldwide "network of networks" that links millions of computers through tens of thousands of separate (but intercommunicating) networks. Via the Internet, users can access tremendous amounts of stored information and establish communication linkages to other Internet-based computers. Much of the Internet is based on the "client-server" model of information exchange. This computer architecture, developed specifically to accommodate the "distributed computing" environment that characterizes the Internet and its component networks, contemplates a server (sometimes called the host)—typically a powerful computer or cluster of computers that behaves as a single computer—which services the requests of a large number of smaller computers, or clients, which connect to it. The client computers usually communicate with a single server at any one time, although they can communicate with one another via the server or can use a server to reach other servers. A server is typically a large mainframe or minicomputer cluster, while the clients may be simple personal computers. Servers providing Internet access to multiple subscriber clients are referred to as "gateways"; more generally, a gateway is a computer system that connects two computer networks.

In order to ensure proper routing of messages between the server and the intended client, the messages are first broken up into data packets, each of which receives a destination address according to a consistent protocol, and which are reassembled upon receipt by the target computer. A commonly accepted set of protocols for this purpose are the Internet Protocol, or IP, which dictates routing information; and the transmission control protocol, or TCP, according to which messages are actually broken up into IP packets for transmission for subsequent collection and reassembly. TCP/IP connections are quite commonly employed to move data across telephone lines.

The Internet supports a large variety of information-transfer protocols. One of these, the World Wide Web (hereafter, simply, the "web"), has recently skyrocketed in importance and popularity; indeed, to many, the Internet is synonymous with the web. Web-accessible information is identified by a uniform resource locator or "URL," which specifies the location of the file in terms of a specific computer and a location on that computer. Any Internet "node"—that is, a computer with an IP address (e.g., a server permanently and continuously connected to the Internet, or a client that has connected to a server and received a temporary IP address)-can access the file by invoking the proper communication protocol and specifying the URL.

Typically, a URL has the format http://<host>/<path>, where "http" refers to the HyperText Transfer Protocol, "host" is the server's Internet identifier, and the "path" specifies the location of the file within the server. Each "web site" can make available one or more web "pages" or documents, which are formatted, tree-structured repositories of information, such as text, images, sounds and animations.

An important feature of the web is the ability to connect one file to many other files using "hypertext" links. A link appears unobtrusively as an underlined portion of text in a document; when the viewer of this document moves the cursor over the underlined text and clicks, the link—which is otherwise invisible to the user—is executed and the linked file retrieved. That file need not be located on the same server as the original file.

Hypertext and searching functionality on the web is typically implemented on the client machine, using a computer program called a "web browser." With the client connected as an Internet node, the browser utilizes URLs-provided either by the user or a link—to locate, fetch and display the specified files. "Display" in this sense can range from simple pictorial and textual rendering to real-time playing of audio and/or video segments. The browser passes the URL to a protocol handler on the associated server, which then retrieves the information and sends it to the browser for display; the browser causes the information to be cached (usually on a hard disk) on the client machine and displayed. The web page itself contains information specifying the specific Internet transfer routine necessary for its retrieval. Thus, clients at various locations can view web pages by downloading replicas of the web pages, via browsers, from servers on which these web pages are stored. Browsers also allow users to download and store the displayed data locally on the client machine.

Most web pages are written in HyperText Markup Language, or HTML, which breaks the document into syntactic portions (such as headings, paragraphs, lists, etc.) that specify layout and contents. An HTML file can contain elements such as text, graphics, tables and buttons, each identified by a "tag." Web browsers utilize HTML interpreters that execute these instructions to display the page.

The number of files accessible just on the web is enormous and constantly growing. As a result, attempting to locate and navigate among documents of interest within the huge space of available files is generally a haphazard process. Certainly the presence of hyperlinks assists the user by identifying files related to the one currently under scrutiny. Any given file probably features several hyperlinks, however, and execution of any of these links typically draws a new web file with hyperlinks of its own. And of course hyperlinks are included at the discretion of a web-document author; they do not, nor are they intended to, provide an exhaustive catalog of web pages containing related information.

In a typical session a user, operating a web browser on a client machine, locates his or her first web page either through prior knowledge of its URL, or using a "search engine" or "web crawler" that locates pages of possible interest based on user-specified key words. Publicly accessible search engines such as ALTA VISTA, YAHOO! and LYCOS process the user's search query and return a list of candidate web pages containing the query, any of which can be readily retrieved and viewed by the user through execution of its associated hyperlink. The user scans through the list of candidate web pages, clicking on entries of possible interest, examining these, and possibly executing hyperlinks associated with some of the retrieved documents. The totality of web pages the user may examine in this fashion form a tree structure, with the candidate pages returned by the search engine constituting the roots. The user's examination can proceed "depthwise" from a root along an arbitrary path of pages linked by a sequence of hyperlinks, or can proceed "breadthwise" at a given hierarchical level through examination of all hyperlinks associated with a given page; generally, a user's session involves both depthwise and breadthwise searching without any advance strategy. Search engines may assist the user by providing a questionnaire, responses to which help focus the search based on explicitly stated user preferences. Such "conversational" tools, however, intrude on the user's browsing activities.

The process of searching, even with automated assistance, is by no means assured to locate the most relevant web pages, due both to the combinatorial expansion of the search space (i.e., the number of hyperlink-accessible pages) with increasing depth, and the difficulty of assessing, merely from its hyperlink designation, the potential usefulness of another web page or the likelihood that another page will contain further useful hyperlinks. The user's time constraints and interest level generally operate to limit the search to a few sites chosen with little information.

The problem is not confined to the Internet. For example, the concept of dividing functionality between a client-based browser and server-based web pages—where the browser locates, fetches and displays resources, executes hyperlinks, and generally interprets web-page information, while the web page contains data, hyperlink addresses, transfer protocols and computer instructions defining "potential functionality" that may be executed by the browser—can be replicated on internal networks as well. These networks, sometimes called "intranets," support the TCP/IP communication protocol and typically serve the needs of a single business (or business department), which may be located at a single site (with individual clients connected by a simple local-area network) or multiple physically dispersed sites requiring a wide-area network but not access to the Internet. Various of the computers forming the intranet network can be utilized as servers for web pages, each with its own URL and offering access to network client computers via TCP/IP. Even more generally, the user may have access to a large database of HTML documents resident on a single machine, using a browser to search through them. In any of these circumstances, the user can face similar difficulties searching among documents.

DESCRIPTION OF THE INVENTION

BRIEF SUMMARY OF THE INVENTION

The present invention operates in tandem with a conventional document-retrieval facility, such as a web browser, by tracking the choices made by the user in retrieving and viewing items (such as web pages)—i.e., which links are followed, when searches are initiated, requests for help, etc.—and, based thereon, identifying additional items likely to be of interest to the user. In other words, the invention browses the same search space as the user, but faster and guided by the user's past behavior. Preferably, the invention operates autonomously, without interruption of the user's activities or explicit requests for stated preferences, providing an "observational"—rather than conversational-mode of assistance. The user receives (in real-time or upon request) a set of current recommendations that take the form of (or include) links to the recommended items, and the user is free to execute any of these links to examine the contents of a recommendation. As used herein, the term "web page" connotes not only items available specifically on the World Wide Web, but instead broadly refers to any items viewable on a browser (or other document-viewing facility) and which may contain links specifying other items and executable by the browser to access such items. Thus, the web page may exist on an intranet or even on a single computer, and need not explicitly utilize the Internet protocol.

To facilitate operation without disruption of the user's viewing activities, the invention preferably functions in a "background" sense, observing the user's browsing activity and generating preference criteria in accordance therewith, then manually examining documents, in parallel with the user's browsing, to identify ones consistent with the preference criteria. These criteria are desirably developed at more than one level. At the item level, the importance of a particular item viewed by the user can be assessed by noting the length of time (relative to the length of the document) the user spends reading the item, the number of hyperlinks in the item that the user executes, whether the user has returned to the item following other browsing, or whether the user has accorded some special status to the item (e.g., by storing it in a "hot list" of preferred documents for ready access). At the content level, the importance of particular aspects of an item is assessed by textual analysis to identify key preference terms—that is, words or phrases that have particular relevance to subject matter of interest to the user, as demonstrated, for example, by recurrence in different items accessed by the user.

As the user peruses a retrieved item, the invention utilizes this "idle time" to perform a search for other items of interest based on the preference criteria. The invention sequentially retrieves items the way a browser would, but for purposes of analysis rather than display. Most generally, the invention performs a "breadth-first" search from the item currently being viewed by the user or from a previously viewed (or otherwise located) item deemed of greater importance, following each of the links specified in that item and searching their contents for matches to key preference terms. In other words, the invention first examines all items at the same hierarchical tree level before proceeding to the next level. A "best-first" refinement of the breadth-first search proceeds by ordering the possibilities by likelihood—that is, using the preference criteria to rank the items at a given hierarchical level, and examining the items in the ranked order.

This approach is especially useful in the preferred search mode, which is time-constrained in changing focus when the user jumps to a new page (whether or not the previous or new page is relevant to the search). In this way, the invention utilizes the occasion of the user's jump to update preference criteria (based, e.g., on the jump itself and elapsed dwell time on the previous page) and begin the search anew. The breadth-first search, it has been found, is efficient in locating items matching the preference criteria than, for example, a "depth-first" search that proceeds down an arbitrary path of pages linked by a linear sequence of hyperlinks.

Reporting of recommendations based on items found in accordance with user preferences can occur in various ways. Most typically, the list appears at all times in a screen window; alternatively, it can remain hidden until the user expressly requests its display.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 1:
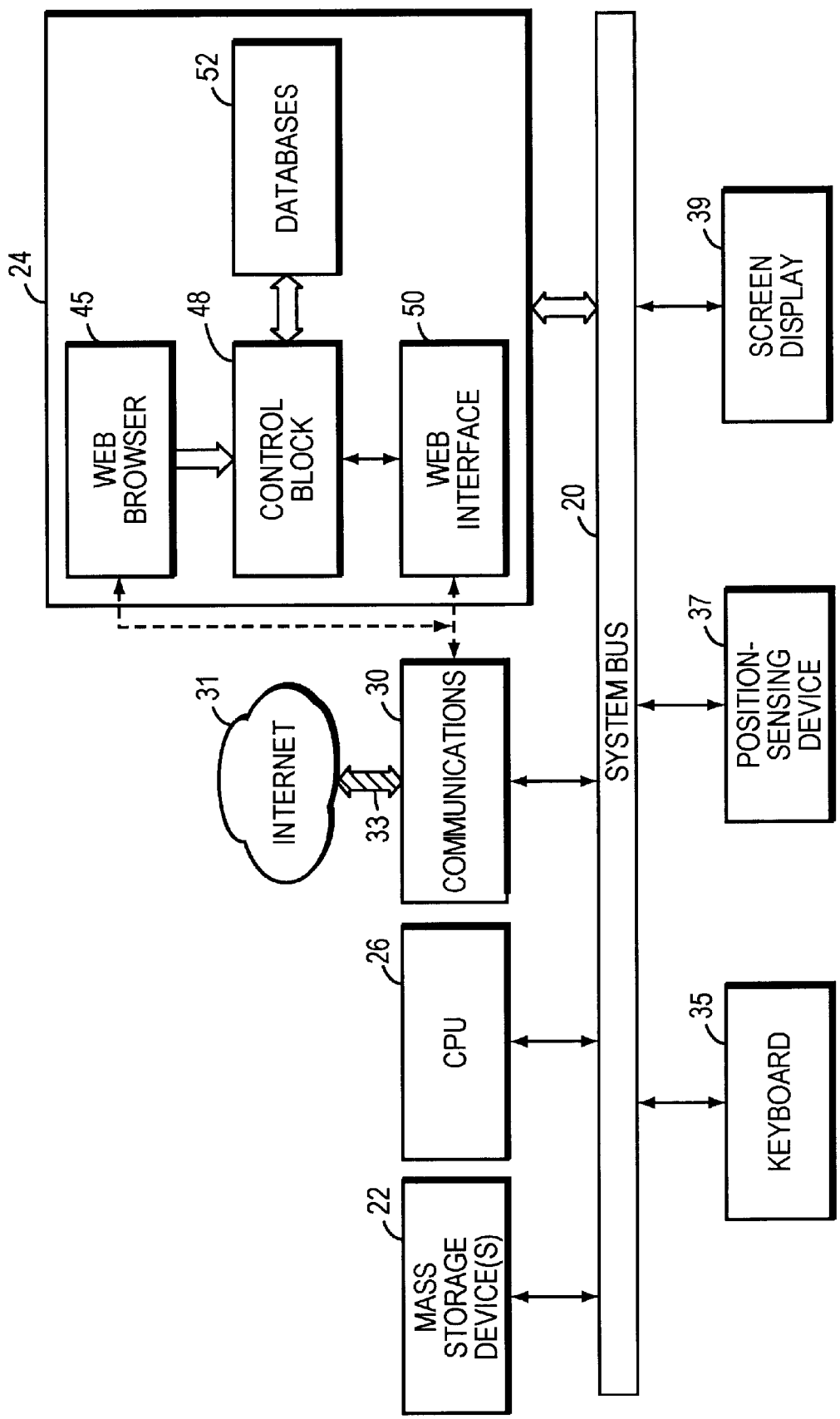
FIG. 1 schematically illustrates a representative hardware environment for the present invention.

Refer first to FIG. 1, which illustrates, in block-diagram form, a representative hardware system incorporating the invention. Although the illustrated embodiment involves an Internet environment, it should be stressed that the invention is by no means limited to such an environment. The system shown in FIG. 1 operates as a network client and may be, for example, a personal computer running the WINDOWS graphical user interface supplied by Microsoft Corp.

The system includes a bidirectional bus 20, over which all system components communicate, at least one mass storage device (such as a hard disk or optical storage unit) 22, and a main system memory 24. Operation of the system is directed by a central-processing unit ("CPU") 26. A conventional communication platform 30, which includes suitable network interface capability and transmission hardware, facilitates connection to and data transfer through a computer network 31 (which may be, as illustrated, the Internet) over a telecommunication link 33. The user interacts with the system using a keyboard 35 and a position-sensing device (e.g., a mouse) 37. The output of either device can be used to designate information or select particular areas of a screen display 39 to direct functions to be performed by the system.

The main memory 24 contains a group of modules that control the operation of CPU 26 and its interaction with the other hardware components. An operating system (not shown) such as WINDOWS directs the execution of low-level, basic system functions such as memory allocation, file management and operation of mass storage device 22, multitasking operations, input/output and basic graphics functions for output on screen display 39. The user's primary interactions with the system occur over a web browser 45, which contains functionality for locating and fetching, via network 31, web items (e.g., pages containing textual information) each identified by a URL, temporarily storing and displaying these, executing hyperlinks contained in web pages and selected by the user, and generally interpreting web-page information. Browser 45 may be any of the numerous available web browsers, e.g., NETSCAPE NAVIGATOR (supplied by Netscape Communications Corp.) or MOSAIC (different versions of which are available free of charge at a variety of web sites).

The primary activities and routines of the present invention are executed by a control block 48, the individual components of which are described in greater detail below. Control block 48 accesses web items by means of a web interface 50, which acts through communication platform 30 and stores retrieved web items in the manner of web browser 45. However, web items retrieved by web interface 50 are not displayed. Preference criteria and the raw data from which preference criteria are derived, as well as the URL identifiers of web items identified by the invention as possibly relevant to the user, are stored in memory partitions collectively denoted at 52.

Figure 2:
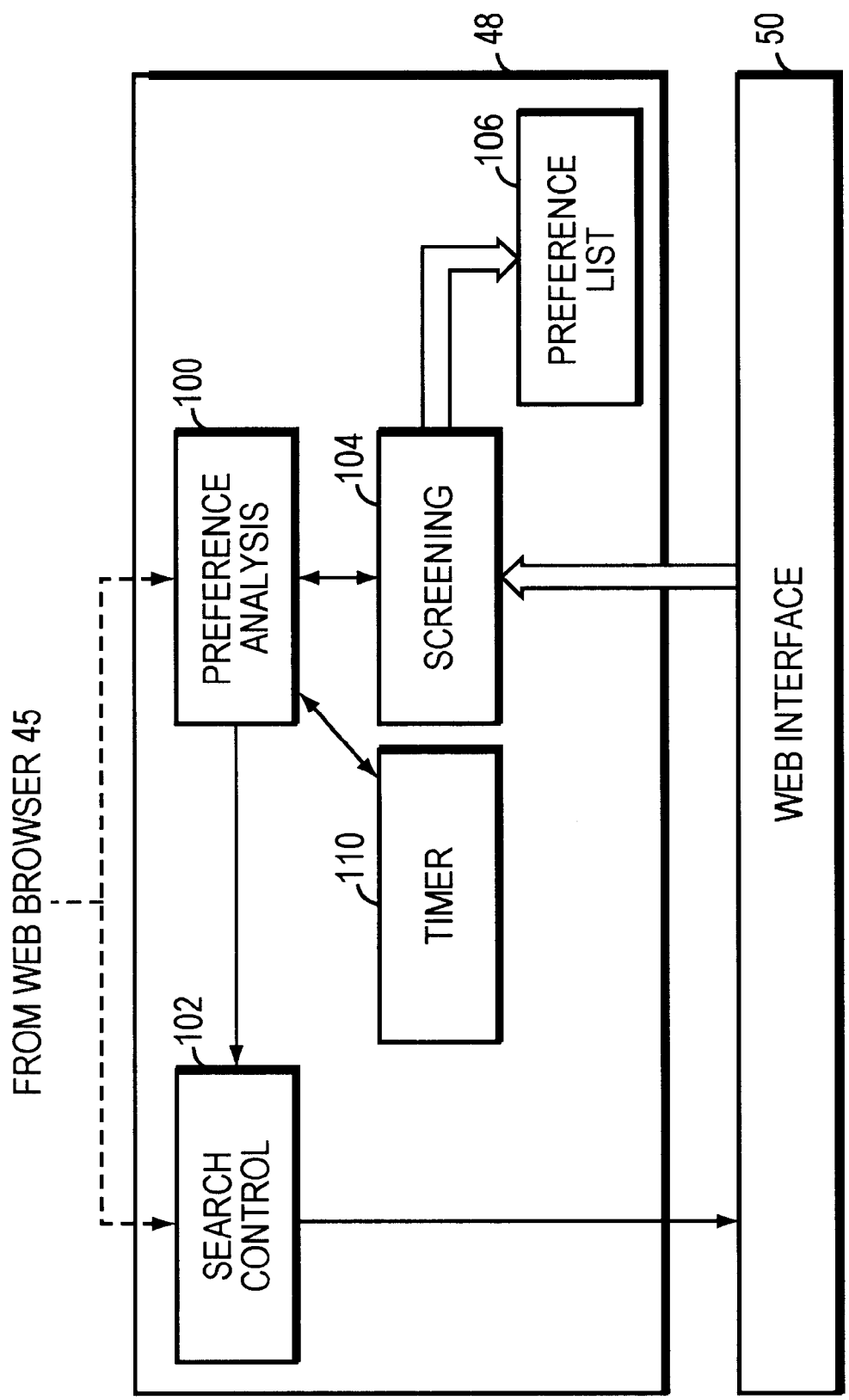
FIG. 2 schematically illustrates the control block of the invention in greater detail.

The internal components of control block 48 appear in FIG. 2. Ordinarily, these components comprise computer instructions, executable by CPU 28, that effectuate the various component functions. Key to the operation of the invention is a preference analysis module 100, which monitors user actions on web browser 24 and, based thereon, develops preference criteria that are used to direct the operation of a search control module 102. As noted earlier, the raw data upon which preference criteria are developed reside in databases 52. Module 102 conducts the actual searches for candidate web items through web interface 50, which performs the mechanical tasks of accessing network 31 and retrieving items.

Retrieved items are examined for relevance by a screening module 104, which applies the preference criteria developed by module 100. If a candidate item meets the preference criteria, screening module 100 adds its URL (and, if desired, further brief descriptive information drawn from the item) to a preference list 106. Web browser 45 is preferably configured to allow the contents of list 106 to appear continuously on a separate window within the web browser screen, although preference list can alternatively be hidden until accessed by user command.

Both analysis module 100 and search control module 102 receive state information from web browser 45. In this way, the activities of both modules can be keyed to the user's browsing behavior. In particular, module 100 desirably performs a discrete preference analysis when web browser 45 retrieves an item for viewing by the user. Upon detecting this condition, module 100 examines the data stored in databases 52 and develops the preference criteria used to guide the operation of search module 102. The data in database 52, in turn, originate with web browser 45, although they are detected and stored by analysis module 100 according to predetermined relevance criteria. The relevance criteria applied by module 100 operate at the item level. Criteria whose values contribute to item-level preference weights include:

1. Whether the user has saved a reference to a retrieved item, e.g., by adding the item's identifier to a "hot list." Such action represents an explicit indication of interest in that item.
2. The length of time the user spends perusing the item relative to its length. To determine this quantity, analysis module 100 activates a timer 110 upon detecting retrieval of an item by web browser 45, and also records the size of the item (i.e., the amount of data received by web browser 45 in the course of complete item retrieval).
3. The cumulative number of times the user has returned to the item in the course of the browsing session.
4. The number of hyperlinks in the item the user has executed. Immediate return to the original item suggests limited interest, while depthwise execution of further links suggests greater interest.
5. Since users tend to browse items and links in a top-to-bottom, left-to-right manner, a link that has been "passed over" can be assumed to hold limited user interest. However, later choice of a passed-over link can reverse the indication.

Raw values associated with these criteria are stored in databases 52 for processing by analysis module 100. The primary purpose of item-level criteria is to rank the items in terms of their contributions to the search effort. Ordinarily, the search proceeds by retrieval (by search module 102) of items linked to items retreived by the user, followed, after screening and to the extent search time permits, by retrieval of items linked to those items, etc. At the very least, item-level rankings determine the order in which user-retrieved items are examined for search-retrievable links. However, if the rankings are very disparate, with one or a few items exhibiting much higher rankings than the rest, search module 102 may perform a depthwise search on these items through a sequence of one or more hyperlinks (each chosen based on the preference criteria), and proceed with the breadth-first search across the lower-level items thereafter. Alternatively, if all rankings are very low, search module 102 may be configured to immediately proceed to a search engine (as described below) instead of performing the breadth-first search. Search module 102 can also be configured to perform "resource-limited" searches wherein accesses to non-local web nodes is restricted to a given maximum.

As search module 102 retrieves items, their data (e.g., textual content) are examined by screening module 104. The relevance criteria applied by screening module 106 operate at the content level; in other words, item-level criteria are utilized to organize the search, while content-level criteria determine the likely attractiveness to the user of a search-retrieved item. Typically, content-level screening is semantic in nature, and is derived from ongoing textual analysis (by module 100) of items retrieved by the user on web browser 45. This analysis ordinarily occurs on an item-by-item basis as the user is reading a retrieved item. In a preferred embodiment, analysis module 100 examines each user-retrieved item for key terminology—that is, terminology likely to be of particular relevance to the user's interests—using the "TFIDF" (term frequency times inverse document frequency) approach, wherein the relevance of each word (or short group of words) is scored according to its frequency in the item and its infrequency in a larger collection of documents (e.g., within a specific database, or in the English language as a whole based on word-occurrence statitistics). In other words, the most relevant terms not only appear frequently in the retrieved item, but would not be expected to appear indiscriminately in virtually any item. The recurrence of a term or name among viewed items also indicates relevance. Alternative semantic measures that may be applied by module 100 in analyzing user-retrieved items can involve topic hierarchies, wherein an electronic thesaurus or dictionary is used to find synonyms to words encountered in the item; the appearance in the item of synonyms signals their importance.

Each item retrieved by search module 102 is examined by screening module 104 according to the content-level preference criteria, and a score assigned to the item based thereon. Items whose scores fall below a predetermined threshold (which may, in some embodiments, be set or at least adjusted by the user) are discarded, while items with above-threshold scores are added to preference list 106. Generally, the items in preference list 106 are ranked and ordered in terms of their respective scores, and appear on display 39 either continuously (in a window) or, preferably, at the command of the user.

Search module 102 can operate in different modes that reflect a tradeoff between search time and the currency of the preference criteria. In time-limited mode, the search begins after module 100 completes its preference analysis following retrieval, by the user, of an item, and continues until the user selects another item. This mode maximizes the accuracy of preference criteria, ensuring that the search utilizes only the most recently computed criteria. In extended-time search modes, the search continues for a set period of time or until some milestone is reached notwithstanding the user's progress beyond the item from which the last preference criteria were derived. For example, a breadth-first search may continue until all top-level links have been explored. The rate at which search module 102 retrieves data items can also be placed within the control of the user, thereby allowing the user to limit the overall cost of automatic retrieval.

If time exists at the conclusion of a search, or if a breadth-first search fails to locate items of likely interest, search module 102 can search for documents using a search engine to locate new links. Search module 102 causes web interface 50 to connect to a publicly accessible search engine by providing its URL (e.g., http://altavista.digital.com, http://www.lycos.com or http://www.yahoo.com. Search module 102 then enters the highest-scored key word or term from database 52 and causes web interface 50 to sequentially access the search hits, which are examined by screening module 104. If time permits, links associated with the items retrieved in this manner can be retrieved for examination as well.

As stressed previously, the invention is not limited to use on the Internet. The above-described representative architecture can, for example, be used directly with local-area networks of computers communicating via, for example, the Ethernet protocol. In a local-area network, the computers can implement TCP/IP over the low-level Ethernet hardware-management routines to create an intranet, or can instead (or in addition) be tied into the Internet as a node via, for example, telephone hookup to an external host computer serving as a commercial Internet provider. Alternatively, the system can be used with other forms of document-viewing facility (whether these involve a computer network or a single machine) by replacing web interface 50 with an appropriate retrieval system.

The invention can also be provided with means for the user to manually cause reset of the preference analysis and clearing of existing values in databases 52. This capability enables the user to signal a complete switch of interest topics.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. Apparatus for identifying electronically encoded data items of interest to a user, the data items being stored on at least one computer and being identified by an item identifier, at least some of the data items being linked to at least one other data item by specifying the identifier of the at least one other data item, the apparatus comprising:
   a. a computer memory;
   b. interactive retrieval means comprising:
      i. means responsive to a user-provided identifier for causing retrieval to the computer memory and display of the data item specified by the identifier; and
      ii. means responsive to a user's selection of an identifier appearing in an already-retrieved data item for causing retrieval to the computer memory of the linked data item specified by the identifier appearing in the already-retrieved data item;
   c. observational means, responsive to the interactive retrieval means, for identifying user preference criteria through analysis of a user's operation of the interactive retrieval means to retrieve data items but without interruption of said operation;
   d. automated retrieval means for causing automatic retrieval to the computer memory of a plurality of new data items, each new data item being linked by a sequence of at least one identifier to a user-selected data item or a data item linked thereto;

e. means for screening the items retrieved by the automated retrieval means in accordance with the preference criteria to produce a search set; and f. means for reporting the search set to a user.

2. The apparatus of claim 1 wherein the data items are stored on a computer network, the network comprising a plurality of network computers having data items accessible to the apparatus via a communication linkage and specified in accordance with a network protocol, each item identifier comprising a protocol identifier.

3. The apparatus of claim 2 wherein the computer network is the Internet.

4. The apparatus of claim 1 wherein the data items are web pages and data items are linked to other data items by means of hyperlinks.

5. The apparatus of claim 4 wherein the data items are web pages.

6. The apparatus of claim 1 wherein the means for identifying user preference criteria comprises means for recording user selections of data items.

7. The apparatus of claim 6 wherein the data items have contents and the means for identifying user preference criteria further comprises means for recording the contents of the user-selected data items and the linked data items.

8. The apparatus of claim 7 wherein the screening means compares the contents of the user-selected data items and the linked data items with the contents of items retrieved by the automated retrieval means.

9. The apparatus of claim 8 wherein the comparison is based on the product of term frequency and inverse document frequency.

10. The apparatus of claim 1 further comprising display means for viewing a retrieved data item, the automated retrieval means causing the retrieval of new data items without display thereof on the display means.

11. The apparatus of claim 10 wherein the automated retrieval means is operative during viewing of a displayed data item to cause automatic retrieval of new data items linked by a sequence of protocol identifiers to the displayed data item, the automatic retrieval ceasing when the data item is no longer displayed.

12. The apparatus of claim 1 further comprising:

a. means for accessing an Internet search engine;

b. means for formulating a search query from the user preference criteria; and c. means for submitting the search query to the search engine, thereby causing the search engine to identify data items matching the search query, the automated retrieval means being configured to retrieve data items identified by the search engine for screening by the screening means.

13. The apparatus of claim 1 wherein:

a. the items include textual material;

b. the preference criteria include (i) item-level criteria specifying a relevance level for an item and (ii) content-level criteria specifying a relevance level for textual material;

c. the item-level criteria govern retrieval of new data items by the automated retrieval means; and d. the content-level criteria govern screening by the screening means of items retrieved by the automated retrieval means.

14. The apparatus of claim 1 wherein the new data items are related to the user-selected data items and the linked data items at a plurality of hierarchical levels, each level comprising new data items linked to a user-selected data item by an identical number of sequential links, the automated retrieval means performing a breadth-first search by causing automatic retrieval to the computer memory of items at one hierarchical level before to causing retrieval of items at a lower hierarchical level.

15. The apparatus of claim 14 wherein the breadth-first search is a best-first search, the automated retrieval means being configured to apply the preference criteria to the items at each hierarchical level to rank said items in an order, the automatic retrieval to the computer memory of items at each hierarchical level occurring in the ranked order.

16. The apparatus of claim 1 wherein automated retrieval proceeds at a user-adjustable rate.

17. A method of identifying electronically encoded data items of interest to a user, the data items being stored on at least one computer and being identified by an item identifier, at least some of the data items being linked to at least one other data item by specifying the identifier of the at least one other data item, the method comprising the steps of:

a. responding to a plurality of user-provided identifiers by causing retrieval and display of the data items specified by the user-provided identifiers;

b. responding to a user's selection, in an already-retrieved data item, of at least one identifier appearing therein and specifying a linked data item by causing retrieval to the computer memory of the at least one linked data item;

c. identifying user preference criteria through observation of the user's retrieval of data items and linked data items but without interruption of said retrieval;

d. causing automatic retrieval to the computer memory of a plurality of new data items, each new data item being linked by a sequence of at least one identifier to a user-selected data item or a data item linked thereto;

e. screening the items retrieved by the automated retrieval means in accordance with the preference criteria to produce a search set; and f. reporting the search set to a user.

18. The method of claim 17 wherein the data items are stored on a computer network, the network comprising a plurality of network computers having data items accessible to the apparatus via a communication linkage and specified in accordance with a network protocol, each item identifier comprising a protocol identifier.

19. The method of claim 18 wherein the computer network is the Internet.

20. The method of claim 19 wherein the protocol identifiers specify the World Wide Web.

21. The method of claim 17 wherein the data items are web pages and data items are linked to other data items by means of hyperlinks.

22. The method of claim 17 wherein the step of identifying user preference criteria comprises analyzing user selections of data items.

23. The method of claim 22 wherein the data items have contents and the step of identifying user preference criteria further comprises analyzing the contents of user-selected data items and linked data items.

24. The method of claim 23 wherein the screening step comprises comparing the contents of user-selected data items and linked data items with the contents of the automatically retrieved new data items.

25. The method of claim 24 wherein the comparison is based on the product of term frequency and inverse document frequency.

26. The method of claim 17 further comprising the steps of:

a. formulating a search query from the user preference criteria;
b. accessing an Internet search engine; and
c. submitting the search query to the search engine, thereby causing the search engine to identify data items matching the search query;
d. retrieving data items identified by the search engine; and
e. screening the data items identified by the search engine in accordance with the preference criteria.

27. The method of claim 17 wherein:

a. the items include textual material;
b. the preference criteria include (i) item-level criteria specifying a relevance level for an item and (ii) content-level criteria specifying a relevance level for textual material;
c. the item-level criteria govern retrieval of new data items; and
d. the content-level criteria govern screening of the automatically retrieved items.

28. The method of claim 17 wherein the new data items are related to the user-selected data items and the linked data items at a plurality of hierarchical levels, each level comprising new data items linked to a user-selected item by an identical number of sequential links, and further comprising the step of performing a breadth-first search by causing automatic retrieval of items at one hierarchical level before to causing retrieval of items at a lower hierarchical level.

29. The method of claim 28 wherein the breadth-first search is a best-first search, the preference criteria being applied to the items at each hierarchical level to rank said items in an order, the automatic retrieval of items at each hierarchical level occurring in the ranked order.

30. The method of claim 17 wherein automated retrieval proceeds at a user-adjustable rate.

* * * * *

UNITED STATES PATENT AND TRADEMARK OFFICE
CERTIFICATE OF CORRECTION

PATENT NO.    : 6,353,822 B1
DATED         : March 5, 2002
INVENTOR(S)   : Lieberman Page 1 of 1

It is certified that error appears in the above-identified patent and that said Letters Patent is hereby corrected as shown below:

<u>Title page, Item [54] and Column 1, line 1,</u>
Replace the title "PROGRAM-LISTING APPENDIX" with the title -- METHOD AND APPARATUS FOR DOCUMENT BROWSING BASED ON REAL-TIME ANALYSIS OF USER PREFERENCES --.

Signed and Sealed this

Twenty-second Day of October, 2002

*Attest:*

*Attesting Officer*

JAMES E. ROGAN
*Director of the United States Patent and Trademark Office*